United States Patent
Jia et al.

(10) Patent No.: US 10,122,916 B2
(45) Date of Patent: Nov. 6, 2018

(54) OBJECT MONITORING METHOD AND DEVICE

(71) Applicant: Beijing Xiaomi Mobile Software Co., Ltd., Haidian District, Beijing (CN)

(72) Inventors: Weiguang Jia, Beijing (CN); Na Ma, Beijing (CN); Enxing Hou, Beijing (CN)

(73) Assignee: BEIJING XIAOMI MOBILE SOFTWARE CO., LTD., Haidian District, Beijing (CN)

( * ) Notice: Subject to any disclaimer, the term of this patent is extended or adjusted under 35 U.S.C. 154(b) by 0 days.

(21) Appl. No.: 15/378,059

(22) Filed: Dec. 14, 2016

(65) Prior Publication Data

US 2017/0310885 A1 Oct. 26, 2017

(30) Foreign Application Priority Data

Apr. 22, 2016 (CN) .......................... 2016 1 0258363

(51) Int. Cl.
*H04N 5/232* (2006.01)
*G08B 13/196* (2006.01)
(Continued)

(52) U.S. Cl.
CPC ... *H04N 5/23222* (2013.01); *G08B 13/19663* (2013.01); *G08B 13/19682* (2013.01); *G08B 13/19684* (2013.01); *G08B 13/19689* (2013.01); *G08B 13/19697* (2013.01); *G08B 21/0208* (2013.01); *G08B 25/08* (2013.01); *G10L 15/02* (2013.01); *G10L 15/063* (2013.01); *G10L 25/51* (2013.01); *H04N 5/23206* (2013.01); *H04N 5/23293* (2013.01); *H04N 7/188* (2013.01); *H05K 999/99* (2013.01)

(58) Field of Classification Search
CPC ........... H04N 5/23222; H04N 5/23206; H04N 5/23293; H04N 5/232; G10L 15/02; G10L 15/063; G10L 25/51
See application file for complete search history.

(56) References Cited

U.S. PATENT DOCUMENTS 8,041,540 B2   10/2011 Kerber
2002/0135485 A1   9/2002 Arakawa
(Continued)

FOREIGN PATENT DOCUMENTS

CN   102094757 A   6/2011
CN   103280220 A   9/2013
(Continued)

OTHER PUBLICATIONS

International Search Report in international application No. PCT/CN2016/091863, dated Dec. 28, 2016.
(Continued)

*Primary Examiner* — Nicholas G Giles
(74) *Attorney, Agent, or Firm* — Jun He Law Offices P.C.; James J. Zhu

(57) ABSTRACT

An object monitoring method and device are provided. The object monitoring method includes: a sound production reason for the target sound is determined when a target sound exists in acquired sounds; and sound production information is pushed to a mobile terminal, the sound production information comprising the sound production reason.

16 Claims, 7 Drawing Sheets

(51) Int. Cl.
*G08B 21/02* (2006.01)
*G08B 25/08* (2006.01)
*G10L 15/02* (2006.01)
*G10L 15/06* (2013.01)
*G10L 25/51* (2013.01)
*H04N 7/18* (2006.01)

(56) References Cited

U.S. PATENT DOCUMENTS

| | | |
|---|---|---|
| 2003/0018975 A1 | 1/2003 | Stone |
| 2004/0253926 A1* | 12/2004 | Gross .................. G08C 17/00 455/67.11 |
| 2007/0030155 A1 | 2/2007 | Van Woudenberg |
| 2011/0135442 A1 | 6/2011 | Kerber |
| 2011/0313555 A1* | 12/2011 | Shoham ................ G10L 25/48 700/94 |
| 2013/0317815 A1* | 11/2013 | Hong .................... G10L 15/16 704/232 |
| 2015/0288877 A1* | 10/2015 | Glazer ................ H04N 5/2251 348/77 |
| 2015/0294553 A1* | 10/2015 | Logan .................. G05B 19/042 340/539.1 |
| 2016/0035205 A1* | 2/2016 | Messenger ............. A61B 5/746 340/539.15 |
| 2016/0150338 A1 | 5/2016 | Kim et al. |
| 2017/0154638 A1* | 6/2017 | Hwang .............. G06K 9/00711 |
| 2017/0195810 A1* | 7/2017 | Gonzales, Jr. ....... G07C 5/0808 |
| 2017/0206766 A1* | 7/2017 | Child ................ G08B 21/0211 |

FOREIGN PATENT DOCUMENTS

| | | |
|---|---|---|
| CN | 103489282 A | 1/2014 |
| CN | 104732689 A | 6/2015 |
| CN | 105208110 A | 12/2015 |
| CN | 105407316 A | 3/2016 |
| CN | 105489217 A | 4/2016 |
| EP | 1629448 A1 | 3/2006 |
| EP | 3006908 A1 | 4/2016 |
| JP | 2004153732 A | 5/2004 |
| JP | 2007228459 A | 9/2007 |

OTHER PUBLICATIONS

Extended European Search Report for European application No. 16197065.2, dated Sep. 18, 2017.
Notification of the First Office Action of Chinese application No. 201610258363.4, dated May 28, 2018.

* cited by examiner

OBJECT MONITORING METHOD AND DEVICE

CROSS-REFERENCE TO RELATED APPLICATIONS

This application is filed based upon and claims priority to Chinese Patent Application No. 2016102583634, filed on Apr. 22, 2016, the entire contents of which are incorporated herein by reference.

TECHNICAL FIELD

The present disclosure generally relates to the technical field of mobile Internet, and more particularly, to an object monitoring method and device.

BACKGROUND

Along with the development of photographic techniques, smart video cameras emerge. Smart video cameras are video cameras adopting the latest technology achievements and the top manufacturing process and combining with years of valuable experiences.

Along with wide application of networked, digitalized and high definition video cameras, people have increasing requirements on smart video cameras. Smart video cameras are applied more and more widely, and their characteristics make them applicable to monitoring of moving targets in all aspects of industries. For example, a smart building, an urban road, a power sector, an airport, a station and the like may be monitored.

Thus, it can be seen that a smart video camera may be used to monitor various objects.

SUMMARY

According to a first aspect of the embodiment of the present disclosure, there is provided an object monitoring method. The method includes: a sound production reason for the target sound is determined when a target sound exists in acquired sounds; and sound production information is pushed to a mobile terminal, the sound production information including the sound production reason.

According to a second aspect of the embodiment of the present disclosure, there is provided an object monitoring device, including: a processor; and a memory for storing instructions executable by the processor, wherein the processor is configured to: determine a sound production reason for the target sound when a target sound exists in acquired sounds; and push sound production information to a mobile terminal, the sound production information including the sound production reason.

According to a third aspect of the embodiment of the disclosure, there is provided a non-transitory computer-readable storage medium having stored therein instructions that, when executed by a processor, causes the processor to perform an object monitoring method, the method comprising: a sound production reason for the target sound is determined when a target sound exists in acquired sounds; and sound production information is pushed to a mobile terminal, the sound production information including the sound production reason.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with some aspects related to the present disclosure as recited in the appended claims.

Figure 1:
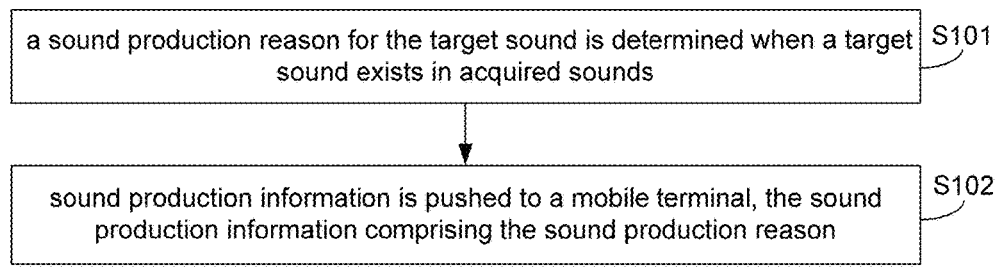
FIG. 1 is a flow chart showing an object monitoring method, according to an exemplary embodiment.

FIG. 1 is a flow chart showing an object monitoring method, according to an exemplary embodiment. As shown in FIG. 1, the object monitoring method may be applied to monitoring equipment, which may include, but not limited to, a smart video camera. The method includes the following Step S101 to Step S102.

Step S101: when a target sound exists in acquired sounds, a sound production reason for the target sound is determined.

Herein, a sound of a monitored object may be acquired through a built-in Microphone (MIC) of the video camera. The monitored object may include, but not limited to, a child, an aged person and the like, and the target sound may refer to a cry and the like.

In this embodiment, after acquiring the target sound such as the cry, the smart video camera may extract cry feature information and match the extracted cry feature information with multiple trained sound templates to obtain the sound production reason for the cry.

In addition, the smart video camera may also interact with a server to obtain the sound production reason for the cry. For example, the smart video camera may send the target sound to the server, and after receiving the target sound, the server may extract the cry feature information and match the extracted cry feature information with the multiple trained sound templates to obtain the sound production reason for the cry, and then returns the sound production reason for the cry to the smart video camera.

Step S102: sound production information is pushed to a mobile terminal, the sound production information including the sound production reason.

In this embodiment, after the sound production reason for the target sound is determined, the sound production information including the sound production reason may be pushed to the mobile terminal such as a mobile phone to prompt the reason for crying of a child to a user.

In addition, the sound production information may also contain the target sound, and for example, the cry of the child and the reason for crying may be pushed to the mobile phone.

According to this embodiment, the sound production reason for the acquired target sound is determined, and the sound production information including the sound production reason is pushed to the mobile terminal, so that the user may obtain the sound production reason for the monitored object to well fulfill the aim of monitoring.

Figure 2:
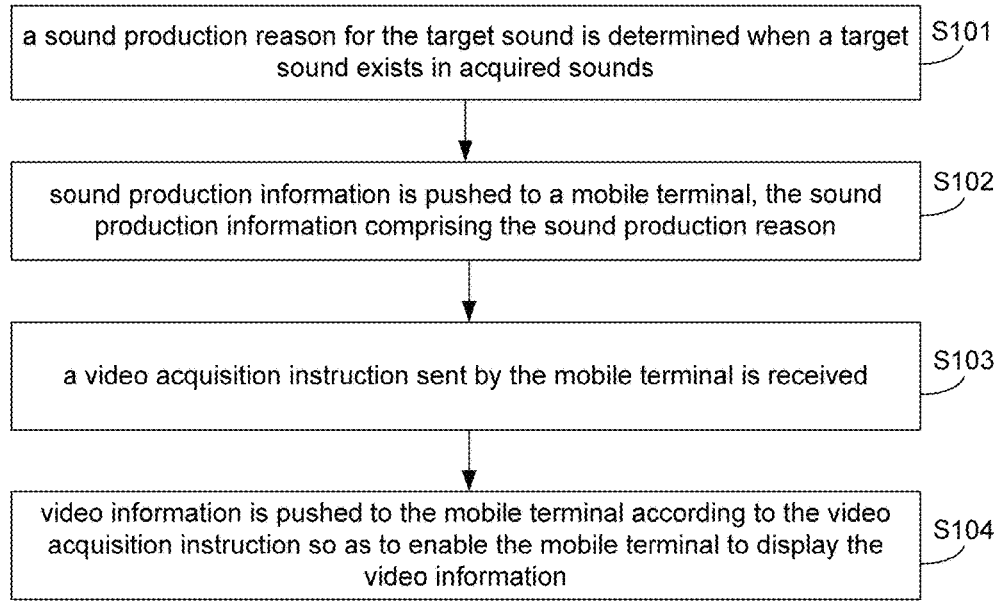
FIG. 2 is a flow chart showing another object monitoring method, according to an exemplary embodiment.

FIG. 2 is a flow chart showing another object monitoring method, according to an exemplary embodiment. As shown in FIG. 2, after Step S102, the method may further include the following steps.

Step S103: a video acquisition instruction sent by the mobile terminal is received.

In this embodiment, after the current monitoring equipment such as the smart video camera with a built-in Wireless Fidelity (WIFI) chip pushes the sound production information to the mobile terminal, if the user is expected to view video information of the monitored object, such as video information of the child, the video acquisition instruction may be sent to the smart video camera through an Application (APP) on the mobile terminal.

In this embodiment, the smart video camera may establish a binding relationship with the APP through the same user account. Before they establish the binding relationship, the smart video camera and the mobile terminal may access to the same router, and a router access process of the smart video camera may be implemented as follows:

The smart video camera broadcasts a message to enable the mobile terminal to display prompt information indicating that the smart video camera does not access a network. If the smart video camera detects that it does not access the network, the user may broadcast a name and a password of his/her own connected router to the smart video camera through the mobile terminal after obtaining the prompt information, and the smart video camera may send a connection request to the router for connection to the router after receiving the name and password of the router.

Since the smart video camera and the mobile terminal are connected to the same router and namely located in the same local area network, the APP may perform scanning to obtain the state of the smart video camera and display the state of the smart video camera, wherein the state includes a bound state and an unbound state.

When the smart video camera is in the unbound state, if the user is intended to control the smart video camera, binding operation may be triggered. Then the APP sends a request containing an identifier of the smart video camera and the user account such as a Millet account to the server. In such a manner, the server may bind the smart video camera and the user account according to the request.

After the smart video camera and the APP of the mobile terminal are bound through the same user account, the user may send a control instruction such as the video acquisition instruction to the smart video camera through the APP of the mobile terminal.

Step S104: video information is pushed to the mobile terminal according to the video acquisition instruction so as to enable the mobile terminal to display the video information.

In this embodiment, the smart video camera may acquire a sound production position of the target sound and control a camera to turn to a direction corresponding to the sound production position and acquire the video information. An acquisition manner for the video information is simple and easy to implement.

After acquiring the video information, the smart video camera may push the video information to the mobile terminal for the user to remotely view the video information of the monitored object such as the child if receiving the video acquisition instruction from the mobile terminal.

Figure 3:
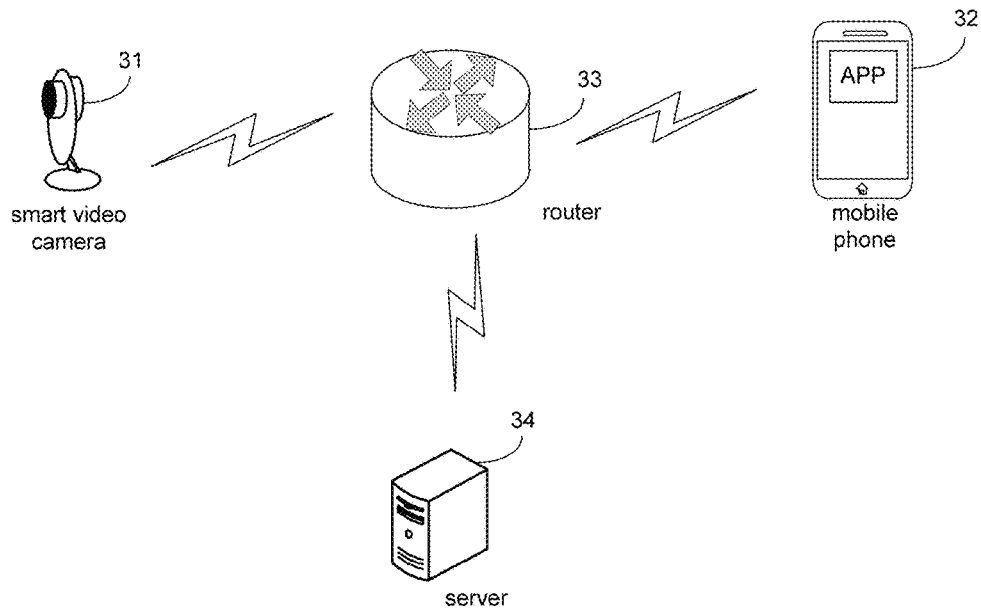
FIG. 3 is a scenario diagram of an object monitoring method, according to an exemplary embodiment.

Exemplary descriptions will be made with reference to FIG. 3. As shown in FIG. 3, the smart video camera 31 extracts the cry feature information and matches the extracted cry feature information with the multiple trained sound templates to obtain the sound production reason for the cry after acquiring the cry in sounds through the built-in MIC. Since the smart video camera 31 and the mobile phone 32 are connected to the same router 33 and namely located in the same local area network, the smart video camera 31 may establish the binding relationship with the APP in the mobile phone 32 through the current user account. Thus, the smart video camera 31 may push the sound production information to the mobile phone 32 through the server 34, and the sound production information includes the sound production reason for the cry. Then the user may send the video acquisition instruction to the smart video camera 31 through the mobile phone if the user wishes to view the video information shot by the smart video camera 31, and the smart video camera 31 may push the acquired video information to the mobile phone 32 to enable the user to remotely view the video information after receiving the video acquisition instruction.

According to the embodiment, the video information is pushed to the mobile terminal to enable the mobile terminal to display the video information, so that it is convenient for the user to remotely view the video information.

Figure 4:
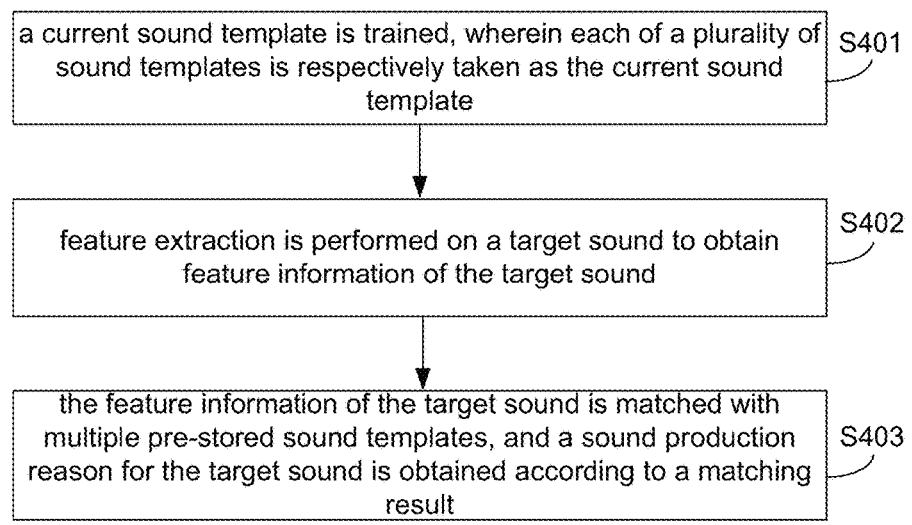
FIG. 4 is a flow chart showing determination about a sound production reason for a target sound, according to an exemplary embodiment.

FIG. 4 is a flow chart showing determination of a sound production reason for a target sound, according to an exemplary embodiment. In this embodiment, descriptions may be made from a monitoring equipment side such as a smart video camera side, or may also be made from a server side. That is, both the monitoring equipment and the server may determine the sound production reason for the target sound in the following manner. As shown in FIG. 4, the method includes the following steps.

Step S401: a current sound template is trained, wherein each of a plurality of sound templates is taken as the current sound template respectively.

In this embodiment, it needs to train each sound template in the multiple sound templates at first to identify the sound production reason after the target sound is input into the sound templates, wherein the multiple sound templates are configured to identify target sounds produced for different reasons.

Figure 5:
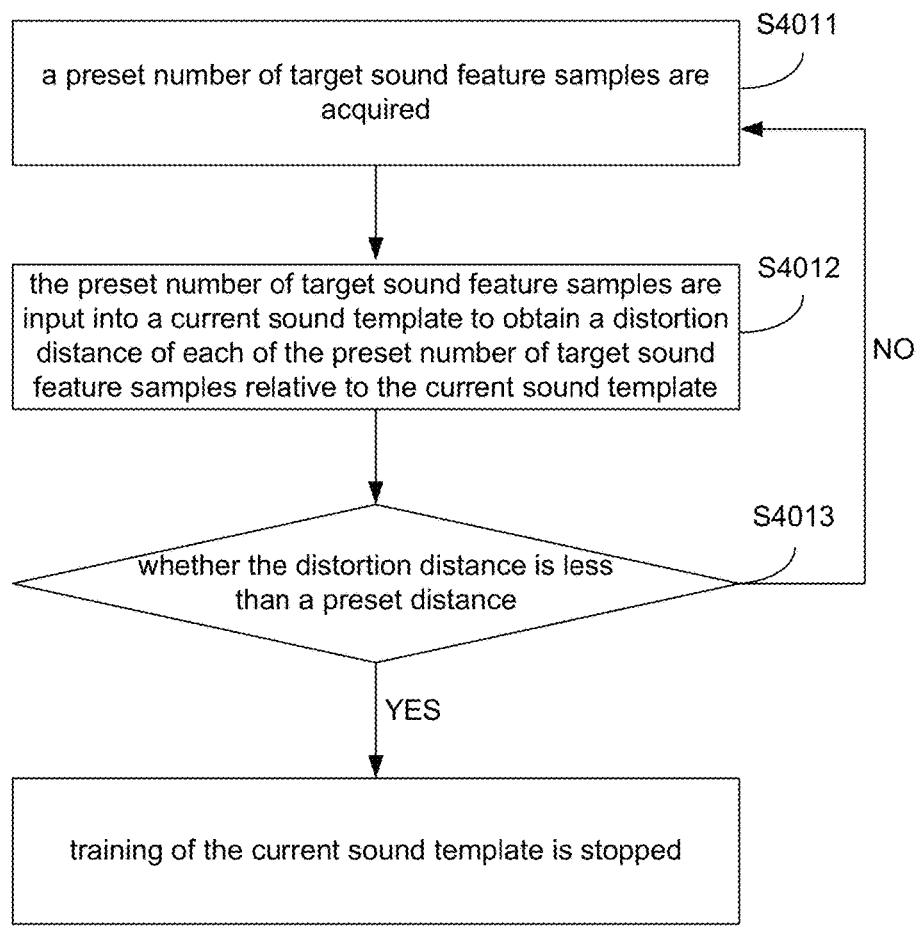
FIG. 5 is a flow chart showing training of a current sound template according to an exemplary embodiment.

As shown in FIG. 5, a process of training the current sound template may include the following steps.

Step S4011: a preset number of target sound feature samples are acquired.

Step S4012: the preset number of target sound feature samples are input into the current sound template to obtain a distortion distance of each of the preset number of target sound feature samples relative to the current sound template.

The distortion distance represents a difference between each of the preset number of target sound feature samples and the target sound output through the current sound template.

Step S4013: whether the distortion distance is less than a preset distance or not is determined. Training of the current sound template is stopped if the distortion distance is less than the preset distance, and Step S4011 is executed if the distortion distance is greater than or equal to the preset distance.

The less the distortion distance is, the less the difference between each of the preset number of target sound feature samples and the target sound output through the current sound template is.

When the distortion distance is less than the preset distance, training of the current sound template is finished, otherwise training is continued until the distortion distance is smaller than the preset distance.

Step S402: feature extraction is performed on the target sound to obtain feature information of the target sound.

In this embodiment, if there are more target sounds such as cries, the target sounds may be compressed at first to reduce a computational and storage burden of a system. In addition, relevance of the target sounds, for example, relevance of the cries, may be eliminated in the compressed target sounds to fulfill the aim of representing a cry signal with less feature information. Of course, if there are not so many target sounds and the relevance has been eliminated, compression is not required. Herein, an existing compression technology such as a nondestructive compression technology may be adopted to compress the target sound.

In this embodiment, after the target sound is compressed to obtain the compressed sound information, feature extraction may be performed on the compressed sound information to obtain the feature information of the target sound.

Step S403: the feature information of the target sound is matched with the multiple pre-stored sound templates, and the sound production reason for the target sound is obtained according to a matching result.

In this embodiment, the extracted feature information of the target sound may be matched with the multiple pre-stored sound templates which have been trained, thereby obtaining the sound production reason for the target sound.

According to the embodiment, the extracted feature information of the target sound is matched with the multiple pre-stored sound templates which have been trained to obtain the sound production reason for the target sound, thus this can be implemented in a simple way, and the obtained sound production reason has high accuracy.

Corresponding to the example object monitoring method, the present disclosure further provides an object monitoring device embodiment.

Figure 6:
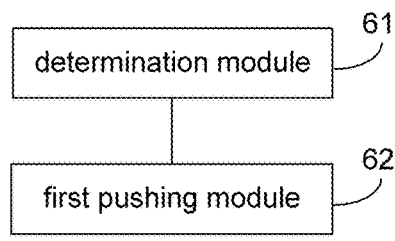
FIG. 6 is a block diagram of an object monitoring device according to an exemplary embodiment.

FIG. 6 is a block diagram of an object monitoring device, according to an exemplary embodiment. As shown in FIG. 6, the object monitoring device includes: a determination module 61 and a first pushing module 62.

The determination module 61 is configured to, when a target sound exists in acquired sounds, determine a sound production reason for the target sound.

Herein, the determination module 61 may acquire a sound of a monitored object through a built-in MIC of a video camera. The monitored object may include, but not limited to, a child, an aged person and the like, and the target sound may refer to a cry and the like.

In this embodiment, after acquiring the target sound such as the cry, the smart video camera may extract cry feature information and match the extracted cry feature information with multiple trained sound templates to obtain the sound production reason for the cry.

In addition, the smart video camera may also interact with a server to obtain the sound production reason for the cry. For example, the smart video camera may send the target sound to the server, and after receiving the target sound, the server may extract the cry feature information and match the extracted cry feature information with the multiple trained sound templates to obtain the sound production reason for the cry, and then returns the sound production reason for the cry to the smart video camera.

The first pushing module 62 is configured to push sound production information to a mobile terminal, the sound production information including the sound production reason determined by the determination module 61.

In this embodiment, after the sound production reason for the target sound is determined, the sound production information containing the sound production reason may be pushed to the mobile terminal such as a mobile phone to prompt the reason for crying of a child to a user.

In addition, the sound production information may also include the target sound, and for example, the cry of the child and the reason for crying may be pushed to the mobile phone.

The device shown in FIG. 6 is configured to implement the method flow shown in FIG. 1. Similar content descriptions are involved, and will not be elaborated herein.

According to this embodiment, the sound production reason for the acquired target sound is determined, and the sound production information including the sound production reason is pushed to the mobile terminal, so that the user may obtain the sound production reason for the monitored object to well fulfill the aim of monitoring.

Figure 7:
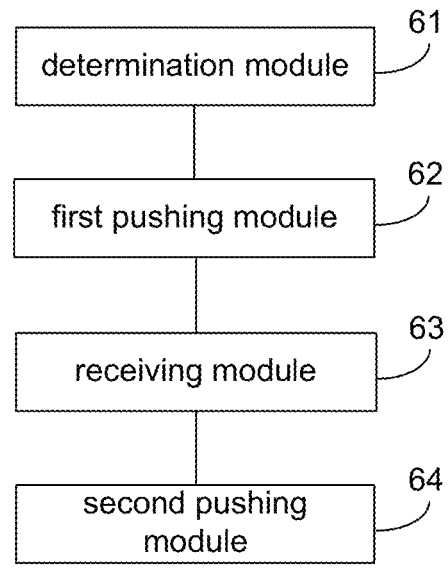
FIG. 7 is a block diagram of another object monitoring device according to an exemplary embodiment.

FIG. 7 is a block diagram of another object monitoring device, according to an exemplary embodiment. As shown in FIG. 7, the device may further, on the basis of the embodiment shown in FIG. 6, include: a receiving module 63 and a second pushing module 64.

The receiving module 63 is configured to receive a video acquisition instruction sent by the mobile terminal after the first pushing module 62 pushes the sound production information to the mobile terminal.

In this embodiment, after current monitoring equipment such as the smart video camera with a built-in WIFI chip pushes the sound production information to the mobile terminal, if the user wishes to view video information of the monitored object, such as video information of the child, the video acquisition instruction may be sent to the smart video camera through an APP on the mobile terminal.

After the smart video camera is bound with the APP of the mobile terminal through the same user account, the user may send a control instruction such as the video acquisition instruction to the smart video camera through the APP of the mobile terminal.

The second pushing module 64 is configured to push video information to the mobile terminal according to the video acquisition instruction received by the receiving module 63 so as to enable the mobile terminal to display the video information.

The device shown in FIG. 7 is configured to implement the method flow shown in FIG. 2. Similar content descriptions are involved, and will not be elaborated herein.

According to the embodiment, the video information is pushed to the mobile terminal to enable the mobile terminal to display the video information, so that it is convenient for the user to remotely view the video information.

Figure 8:
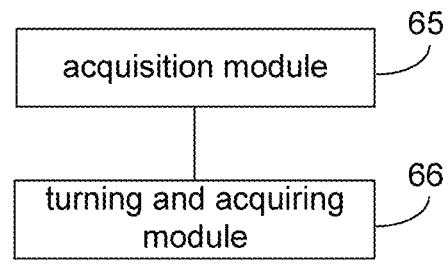
FIG. 8 is a block diagram of another object monitoring device according to an exemplary embodiment.

FIG. 8 is a block diagram of another object monitoring device, according to an exemplary embodiment. As shown in FIG. 8, the device may further, on the basis of the embodiment shown in FIG. 7, include: an acquisition module 65 and a turning and acquiring module 66.

The acquisition module 65 is configured to acquire a sound production position from where the target sound is produced before the second pushing module 64 pushes the video information to the mobile terminal according to the video acquisition instruction.

The turning and acquiring module 66 is configured to control a camera to turn to a direction corresponding to the sound production position acquired by the acquisition module 65 and acquire the video information.

In this embodiment, the smart video camera may acquire the sound production position of the target sound and control the camera to turn to the direction corresponding to the sound production position and acquire the video information. An acquisition manner for the video information is simple and easy to implement.

The device shown in FIG. 8 is configured to implement the method flow shown in FIG. 2. Similar content descriptions are involved and will not be elaborated herein.

According to this embodiment, the sound production position of the target sound is acquired to acquire the video information, thus this can be implemented in a simple way.

Figure 9:
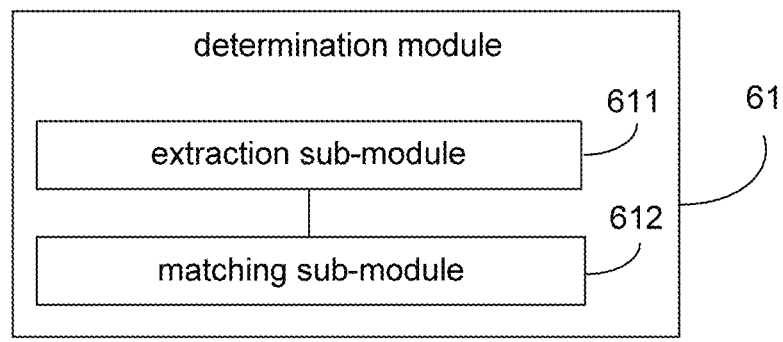
FIG. 9 is a block diagram of another object monitoring device according to an exemplary embodiment.

FIG. 9 is a block diagram of another object monitoring device, according to an exemplary embodiment. As shown in FIG. 9, the determination module 61 may, on the basis of the embodiment shown in FIG. 6, include: an extraction sub-module 611 and a matching sub-module 612.

The extraction sub-module 611 is configured to perform feature extraction on a target sound to obtain feature information of the target sound.

The matching sub-module 612 is configured to match the feature information of the target sound extracted by the extraction sub-module 611 and multiple pre-stored sound templates, and obtain the sound production reason for the target sound according to a matching result. The multiple sound templates is configured to identify target sounds produced for different reasons.

In this embodiment, the extracted feature information of the target sound may be matched with the multiple pre-stored sound templates which have been trained, thereby obtaining the sound production reason for the target sound.

The device shown in FIG. 9 is configured to implement the method flow shown in FIG. 4. Similar content descriptions are involved and will not be elaborated herein.

According to the embodiment, the extracted feature information of the target sound is matched with the multiple pre-stored sound templates which have been trained to obtain the sound production reason for the target sound, thus this can be implemented in a simple way, and the obtained sound production reason has high accuracy.

Figure 10:
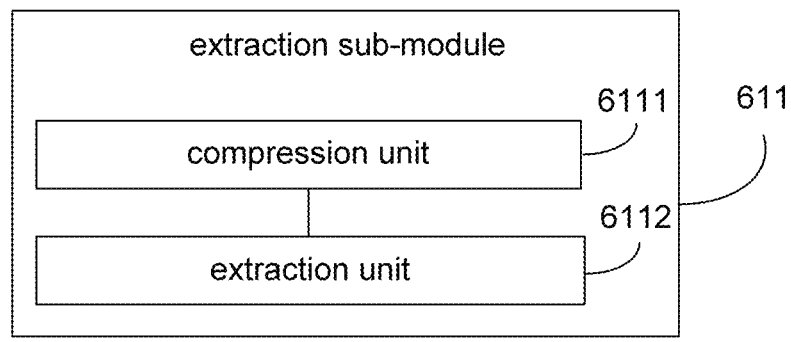
FIG. 10 is a block diagram of another object monitoring device according to an exemplary embodiment.

FIG. 10 is a block diagram of another object monitoring device, according to an exemplary embodiment. As shown in FIG. 10, the extraction sub-module 611 may, on the basis of the embodiment shown in FIG. 9, include: a compression unit 6111 and an extraction unit 6112.

The compression unit 6111 is configured to compress the target sound to obtain compressed sound information.

The extraction unit 6112 is configured to perform feature extraction on the compressed sound information obtained by the compression unit 6111 to obtain feature information of the target sound.

The device shown in FIG. 10 is configured to implement the method flow shown in FIG. 4. Similar content descriptions are involved and will not be elaborated herein.

In the embodiment, if there are more target sounds such as cries, the target sounds may be compressed at first to reduce a computational and storage burden of a system. In addition, relevance of the target sounds, for example, relevance of the cries, may be eliminated in the compressed target sounds to fulfill the aim of representing a cry signal with less feature information. Of course, if there are not so many target sounds and the relevance has been eliminated, compression is not required. Herein, an existing compression technology such as a nondestructive compression technology may be adopted to compress the target sound.

According to this embodiment, the target sound is compressed, so that it is possible to fulfill the aims of reducing the computational and storage burden of the system and eliminating the target sound relevance.

Figure 11:
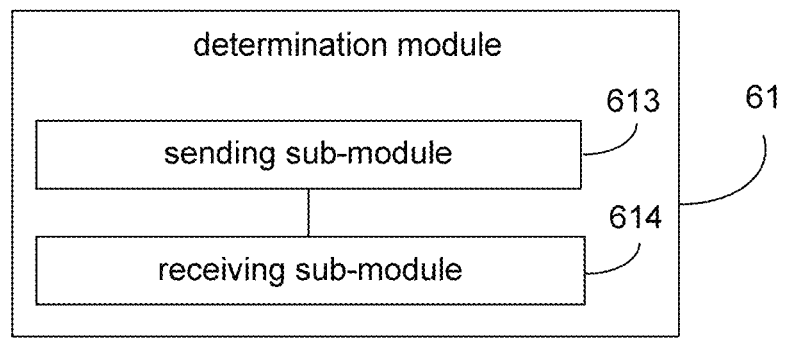
FIG. 11 is a block diagram of another object monitoring device according to an exemplary embodiment.

FIG. 11 is a block diagram of another object monitoring device, according to an exemplary embodiment. As shown in FIG. 11, the determination module 61 may, on the basis of the embodiment shown in FIG. 6, include: a sending sub-module 613 and a receiving sub-module 614.

The sending sub-module 613 is configured to send the target sound to a server.

The receiving sub-module 614 is configured to receive the sound production reason for the target sound returned by the server.

The object monitoring device such as the smart video camera may interact with the server to obtain the sound production reason for the cry. For example, the smart video camera may send the target sound to the server, and after receiving the target sound, the server may also extract the cry feature information and match the extracted cry feature information with the multiple trained sound templates to obtain the sound production reason for the cry, and then returns the sound production reason for the cry to the smart video camera.

The device shown in FIG. 11 is configured to implement the method flow shown in FIG. 1. Similar content descriptions are involved and will not be elaborated herein.

According to the embodiment, the sound production reason for the target sound may also be determined by interaction with the server, so that many manners may be adopted to determine the sound production reason for the target sound.

Figure 12:
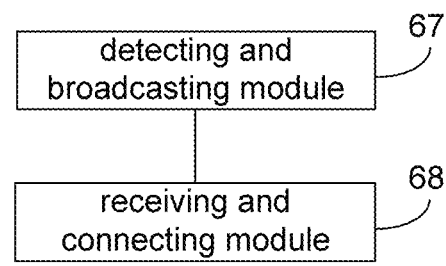
FIG. 12 is a block diagram of another object monitoring device according to an exemplary embodiment.

FIG. 12 is a block diagram of another object monitoring device, according to an exemplary embodiment. As shown in FIG. 12, the device may further, on the basis of the embodiment shown in FIG. 7, include: a detecting and broadcasting module 67 and a receiving and connecting module 68.

The detecting and broadcasting module 67 is configured to broadcast a message to enable the mobile terminal to display prompt information indicating that the current monitoring equipment does not access the network if it is detected that current monitoring equipment does not access a network.

The receiving and connecting module 68 is configured to receive a name and a password of a router broadcast by the mobile terminal and send a connection request to the router for connection to the router.

In this embodiment, the smart video camera may establish a binding relationship with the APP through the same user account. Before they establish the binding relationship, the smart video camera and the mobile terminal may access to the same router, and a router access process of the smart video camera may be implemented as follows.

The smart video camera broadcasts a message to enable the mobile terminal to display prompt information indicating that the smart video camera does not access a network, if the smart video camera detects that it does not access the network, the user may broadcast a name and a password of his/her own connected router to the smart video camera through the mobile terminal after obtaining the prompt information, and the smart video camera may send a connection request to the router for connection to the router after receiving the name and password of the router.

Since the smart video camera and the mobile terminal are connected to the same router and namely located in the same local area network, the APP may perform scanning to obtain a state of the smart video camera and display the state of the smart video camera, wherein the state includes a bound state and an unbound state.

When the smart video camera is in the unbound state, if the user is intended to control the smart video camera, binding operation may be triggered. Then the APP sends a request containing an identifier of the smart video camera and the user account such as a Millet account to the server. In such a manner, the server may bind the smart video camera and the user account according to the request.

The device shown in FIG. 12 is configured to implement the method flow shown in FIG. 2. Similar descriptions are involved and will not be elaborated herein.

According to this embodiment, access to the router is implemented by interaction with the mobile terminal, so that a condition is provided for establishment of the binding relationship therebetween, and a condition is further provided for subsequent monitoring.

Figure 13:
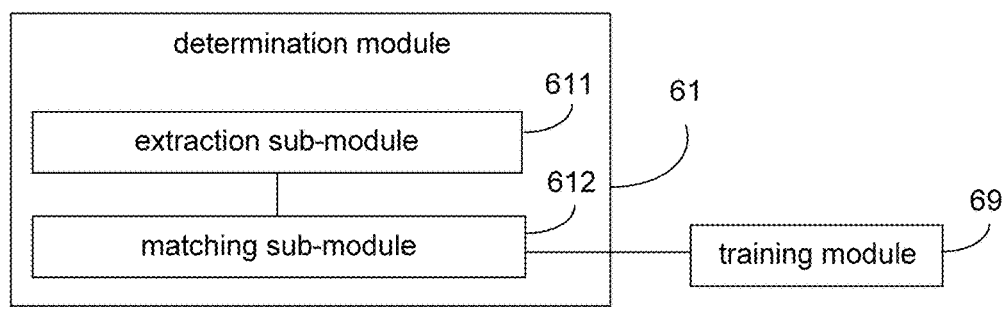
FIG. 13 is a block diagram of another object monitoring device according to an exemplary embodiment.

FIG. 13 is a block diagram of another object monitoring device, according to an exemplary embodiment. As shown in FIG. 13, the device may further, on the basis of the embodiment shown in FIG. 9, include: a training module 69.

The training module 69 is configured to train the current sound template, wherein each of a plurality of sound templates is taken as the current sound template respectively.

In this embodiment, it needs to train each sound template in the multiple sound templates at first to identify the sound production reason after the target sound is input into the sound templates, wherein the multiple sound templates are configured to identify the target sounds produced for different reasons.

The device shown in FIG. 13 is configured to implement the method flow shown in FIG. 4. Similar content descriptions are involved and will not be elaborated herein.

According to the embodiment, the sound templates are trained to provide a condition for determining the sound production reason for the target sound.

Figure 14:
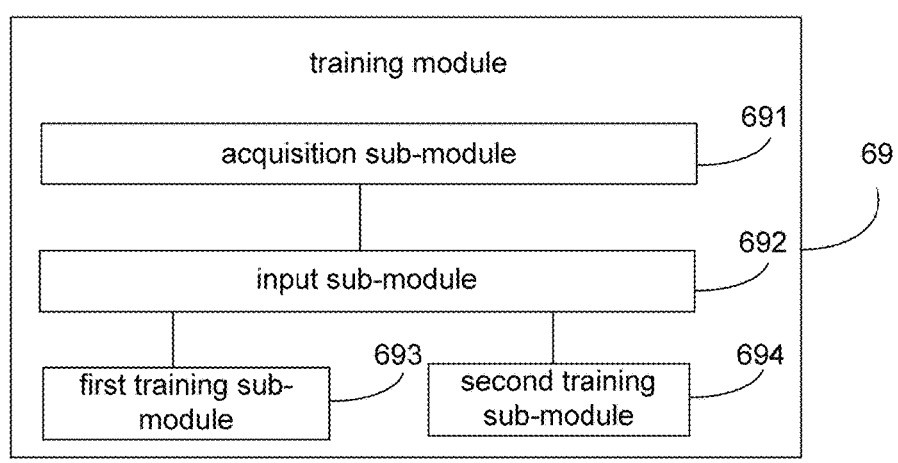
FIG. 14 is a block diagram of another object monitoring device according to an exemplary embodiment.

FIG. 14 is a block diagram of another object monitoring device, according to an exemplary embodiment. As shown in FIG. 14, the training module may, on the basis of the embodiment shown in FIG. 13, include: an acquisition sub-module 691, an input sub-module 692, a first training sub-module 693 and a second training sub-module 694.

The acquisition sub-module 691 is configured to acquire a preset number of target sound feature samples.

The input sub-module 692 is configured to input the preset number of target sound feature samples acquired by the acquisition sub-module 691 into the current sound template to obtain a distortion distance of each of the preset number of target sound feature samples relative to the current sound template, and the distortion distance represents a difference between each of the preset number of target sound feature samples and the target sound output through the current sound template.

The first training sub-module 693 is configured to stop training the current sound template if the distortion distance obtained by the input sub-module 692 is less than a preset distance.

The second training sub-module 694 is configured to continue invoking the training module to train the current sound template until the distortion distance is less than the preset distance if the distortion distance obtained by the input sub-module 692 is greater than or equal to the preset distance, Herein, the less the distortion distance is, the less the difference between each of the preset number of target sound feature samples and the target sound output through the current sound template is.

When the distortion distance is less than the preset distance, training of the current sound template is finished, otherwise training is continued until the distortion distance is less than the preset distance.

The device shown in FIG. 14 is configured to implement the method flow shown in FIG. 5. Similar content descriptions are involved and will not be elaborated herein.

According to the embodiment, the preset number of target sound feature samples are input into the current sound templates to obtain the distortion distances. The distortion distances are compared with the preset distance to implement a sound template training process, thus this can be implemented in a simple way, and the trained sound templates may accurately identify the sound production reasons for the target sound.

With respect to the devices in the above embodiments, the specific manners for performing operations for individual modules and sub-modules therein have been described in detail in the embodiments regarding the methods, which will not be elaborated herein.

Figure 15:
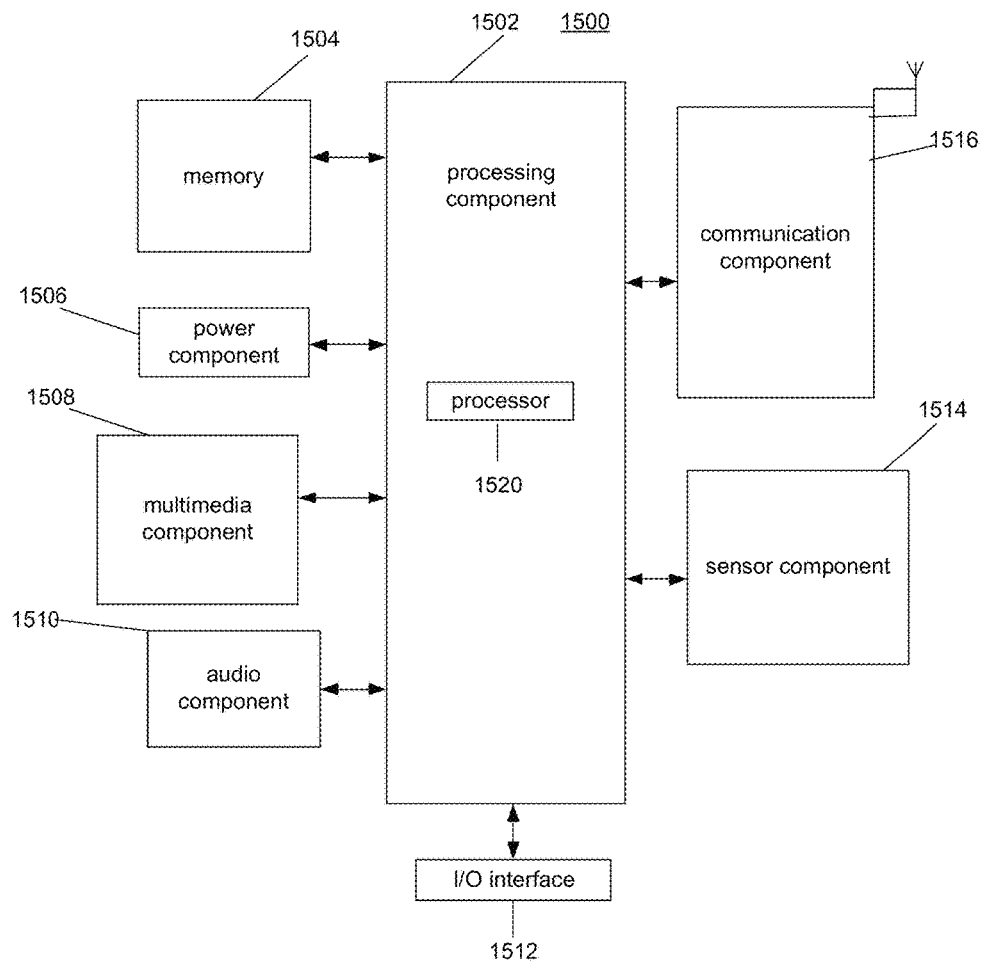
FIG. 15 is a block diagram of an object monitoring device according to an exemplary embodiment.

FIG. 15 is a block diagram of an object monitoring device, according to an exemplary embodiment. For example, the device 1500 may be a mobile phone, a computer, a digital broadcast terminal, a messaging device, a gaming console, a tablet, a medical device, exercise equipment, a Personal Digital Assistant (PDA), an aircraft and the like.

Referring to FIG. 15, the device 1500 may include one or more of the following components: a processing component 1502, a memory 1504, a power component 1506, a multimedia component 1508, an audio component 1510, an Input/Output (I/O) interface 1512, a sensor component 1514, and a communication component 1516.

The processing component 1502 typically controls overall operations of the device 1500, such as the operations associated with display, telephone calls, data communications, camera operations, and recording operations. The processing component 1502 may include one or more processors 1520 to execute instructions to perform all or part of the steps in the abovementioned method. Moreover, the processing component 1502 may include one or more modules which facilitate interaction between the processing component 1502 and the other components. For instance, the processing component 1502 may include a multimedia module to facilitate interaction between the multimedia component 1508 and the processing component 1502.

The memory 1504 is configured to store various types of data to support the operation of the device 1500. Examples of such data include instructions for any APPs or methods operated on the device 1500, contact data, phonebook data, messages, pictures, video, etc. The memory 1504 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1506 provides power for various components of the device 1500. The power component 1506 may include a power management system, one or more power supplies, and other components associated with the generation, management and distribution of power for the device 1500.

The multimedia component 1508 includes a screen providing an output interface between the device 1500 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 1508 includes a front camera and/or a rear camera. The front camera and/or the rear camera may receive external multimedia data when the device 1500 is in an operation mode, such as a photographing mode or a video mode. Each of the front camera and the rear camera may be a fixed optical lens system or have focusing and optical zooming capabilities.

The audio component 1510 is configured to output and/or input an audio signal. For example, the audio component 1510 includes a MIC, and the MIC is configured to receive an external audio signal when the device 1500 is in the operation mode, such as a call mode, a recording mode and a voice recognition mode. The received audio signal may be further stored in the memory 1504 or sent through the communication component 1516. In some embodiments, the audio component 1510 further includes a speaker configured to output the audio signal.

The I/O interface 1512 provides an interface between the processing component 1502 and a peripheral interface module, and the peripheral interface module may be a keyboard, a click wheel, a button and the like. The button may include, but not limited to: a home button, a volume button, a starting button and a locking button.

The sensor component 1514 includes one or more sensors configured to provide status assessment in various aspects for the device 1500. For instance, the sensor component 1514 may detect an on/off status of the device 1500 and relative positioning of components, such as a display and small keyboard of the device 1500, and the sensor component 1514 may further detect a change in a position of the device 1500 or a component of the device 1500, presence or absence of contact between the user and the device 1500, orientation or acceleration/deceleration of the device 1500 and a change in temperature of the device 1500. The sensor component 1514 may include a proximity sensor configured to detect presence of an object nearby without any physical contact. The sensor component 1514 may also include a light sensor, such as a Complementary Metal Oxide Semiconductor (CMOS) or Charge Coupled Device (CCD) image sensor, configured for use in an imaging application. In some embodiments, the sensor component 1514 may also include an acceleration sensor, a gyroscope sensor, a magnetic sensor, a pressure sensor or a temperature sensor.

The communication component 1516 is configured to facilitate wired or wireless communication between the device 1500 and another device. The device 1500 may access a communication-standard-based wireless network, such as a WIFI network, a 2nd-Generation (2G) or 3rd-Generation (3G) network or a combination thereof. In an exemplary embodiment, the communication component 1516 receives a broadcast signal or broadcast associated information from an external broadcast management system through a broadcast channel. In an exemplary embodiment, the communication component 1516 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BlueTooth (BT) technology and another technology.

In an exemplary embodiment, the device 1500 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 1504 including an instruction, and the instruction may be executed by the processor 1520 of the device 1500 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

INDUSTRIAL APPLICABILITY

The embodiments of the present disclosure may achieve beneficial effects as follows.

The sound production reason for the acquired target sound is determined, and the sound production information containing the sound production reason is pushed to the mobile terminal, so that a user may obtain the sound production reason for a monitored object to well fulfill the aim of monitoring.

The video information is pushed to the mobile terminal to enable the mobile terminal to display the video information, so that it is convenient for the user to remotely view the video information.

The sound production position from where the target sound is produced is acquired to acquire the video information, thus this can be implemented in a simple way.

The extracted feature information of the target sound is matched with the multiple pre-stored sound templates which have been trained to obtain the sound production reason for the target sound, thus this can be implemented in a simple way, and the obtained sound production reason has high accuracy.

The target sound is compressed, so that it is possible to fulfill the aims of reducing a computational and storage burden of a system and eliminating target sound relevance.

The sound production reason for the target sound may also be determined by interaction with the server, so that many manners may be adopted to determine the sound production reason for the target sound.

Access to the router is implemented by interaction with the mobile terminal, so that a condition is provided for establishment of a binding relationship therebetween, and a condition is further provided for subsequent monitoring.

The sound templates are trained to provide a condition for determining the sound production reason for the target sound.

The preset number of target sound feature samples are input into the current sound templates to obtain the distortion distances, the distortion distances are compared with the preset distance to implement a sound template training process, thus this can be implemented in a simple way, and the trained sound templates may accurately identify the sound production reasons for the target sound.

The sound production information further contains the target sound, so that the sound production information pushed to the mobile terminal is diversified.

What is claimed is:

1. An object monitoring method, comprising:
   determining a sound production reason for a target sound when the target sound exists in acquired sounds;
   pushing sound production information to a mobile terminal, the sound production information comprising the sound production reason;
   receiving a video acquisition instruction sent by the mobile terminal;
   pushing video information to the mobile terminal according to the video acquisition instruction so as to enable the mobile terminal to display the video information;
   broadcasting a message to enable the mobile terminal to display prompt information indicating that a current monitoring equipment does not access a network responsive to detecting that the current monitoring equipment does not access the network;
   receiving a name and a password of a router broadcast by the mobile terminal; and
   sending a connection request to the router for connection to the router.

2. The object monitoring method according to claim 1, further comprising: before pushing the video information to the mobile terminal according to the video acquisition instruction,
   acquiring a sound production position of the target sound; and
   controlling a camera to turn to a direction corresponding to the sound production position and acquire the video information.

3. The object monitoring method according to claim 1, wherein determining the sound production reason for the target sound comprises:
   performing feature extraction on the target sound to obtain feature information of the target sound; and
   matching the feature information of the target sound with a plurality of sound templates which are pre-stored, and obtaining the sound production reason for the target sound according to a matching result, the plurality of sound templates being configured to identify target sounds produced for different reasons.

4. The object monitoring method according to claim 3, wherein performing feature extraction on the target sound to obtain the feature information of the target sound comprises:
   compressing the target sound to obtain compressed sound information; and
   performing feature extraction on the compressed sound information to obtain the feature information of the target sound.

5. The object monitoring method according to claim 1, wherein determining the sound production reason for the target sound comprises:
   sending the target sound to a server; and
   receiving the sound production reason for the target sound returned by the server.

6. The object monitoring method according to claim 3, further comprising:
   training a current sound template, wherein each of the plurality of sound templates is taken as the current sound template respectively.

7. The object monitoring method according to claim 6, wherein training the current sound template comprises:
   acquiring a preset number of target sound feature samples;
   inputting the preset number of target sound feature samples into the current sound template to obtain a distortion distance of each of the preset number of target sound feature samples relative to the current sound template, the distortion distance representing a difference between each of the preset number of target sound feature samples and a target sound output through the current sound template;
   stopping training of the current sound template responsive to the distortion distance being less than a preset distance;
   continuing training of the current sound template until the distortion distance is less than the preset distance responsive to the distortion distance being greater than or equal to the preset distance.

8. The object monitoring method according to claim 1, wherein the sound production information further comprises the target sound.

9. An object monitoring device, comprising:
   a processor; and
   a memory for storing instructions executable by the processor, wherein the processor is configured to:
  determine a sound production reason for a target sound when the target sound exists in acquired sounds;
  push sound production information to a mobile terminal, the sound production information comprising the sound production reason;
  receive a video acquisition instruction sent by the mobile terminal;
  push video information to the mobile terminal according to the video acquisition instruction so as to enable the mobile terminal to display the video information;
  broadcast a message to enable the mobile terminal to display prompt information indicating that a current monitoring equipment does not access a network responsive to detecting that the current monitoring equipment does not access the network;
  receive a name and a password of a router broadcast by the mobile terminal; and
  send a connection request to the router for connection to the router.

10. The object monitoring device according to claim 9, wherein the processor is further configured to, before pushing the video information to the mobile terminal according to the video acquisition instruction,
  acquire a sound production position of the target sound; and
  control a camera to turn to a direction corresponding to the sound production position and acquire the video information.

11. The object monitoring device according to claim 9, wherein in order to determine the sound production reason for the target sound, the processor is configured to:
  perform feature extraction on the target sound to obtain feature information of the target sound; and
  match the feature information of the target sound with a plurality of sound templates which are pre-stored, and obtain the sound production reason for the target sound according to a matching result, the plurality of sound templates being configured to identify target sounds produced for different reasons.

12. The object monitoring device according to claim 11, wherein in order to perform feature extraction on the target sound to obtain the feature information of the target sound, the processor is configured to:
  compress the target sound to obtain compressed sound information; and
  perform feature extraction on the compressed sound information to obtain the feature information of the target sound.

13. The object monitoring device according to claim 9, wherein in order to determine the sound production reason for the target sound, the processor is configured to:
  send the target sound to a server; and
  receive the sound production reason, returned by the server, for the target sound.

14. The object monitoring device according to claim 11, wherein the processor is further configured to:
  train a current sound template, wherein each of the plurality of sound templates is taken as the current sound template respectively.

15. The object monitoring device according to claim 14, wherein in order to train the current sound template, the processor is configured to:
  acquire a preset number of target sound feature samples;
  input the preset number of target sound feature samples into the current sound template to obtain a distortion distance of the preset number of target sound feature samples relative to the current sound template, the distortion distance representing a difference between the preset number of target sound feature samples and a target sound output through the current sound template;
  stop training of the current sound template responsive to the distortion distance being less than a preset distance;
  continue training of the current sound template until the distortion distance is smaller than the preset distance responsive to the distortion distance being greater than or equal to the preset distance.

16. A non-transitory computer-readable storage medium having stored therein instructions that, when executed by a processor, causes the processor to perform an object monitoring method, the method comprising:
  determining a sound production reason for a target sound when the target sound exists in acquired sounds;
  pushing sound production information to a mobile terminal, the sound production information comprising the sound production reason;
  receiving a video acquisition instruction sent by the mobile terminal;
  pushing video information to the mobile terminal according to the video acquisition instruction so as to enable the mobile terminal to display the video information;
  broadcasting a message to enable the mobile terminal to display prompt information indicating that a current monitoring equipment does not access a network responsive to detecting that the current monitoring equipment does not access the network;
  receiving a name and a password of a router broadcast by the mobile terminal; and
  sending a connection request to the router for connection to the router.

* * * * *